United States Patent [19]
Yamawaki et al.

[11] 3,975,461
[45] Aug. 17, 1976

[54] PROCESS FOR PREPARING A GRAFT COPOLYMER

[75] Inventors: Takeshi Yamawaki, Komae; Masahiro Hayashi, Yokohama; Kazuo Endo, Tokyo, all of Japan

[73] Assignee: Mitsubishi Chemical Industries Ltd., Tokyo, Japan

[22] Filed: Jan. 11, 1974

[21] Appl. No.: 432,585

Related U.S. Application Data

[63] Continuation-in-part of Ser. No. 159,468, July 2, 1971, abandoned.

[30] Foreign Application Priority Data

Nov. 14, 1970 Japan.............................. 45-100518

[52] U.S. Cl................................. 260/879; 526/85; 526/222; 526/223; 526/229; 526/332; 526/328; 526/342; 526/345
[51] Int. Cl.².............. C08F 257/02; C08F 265/04; C08F 267/08; C08F 279/02
[58] Field of Search......................... 260/879, 880 R

[56] References Cited
UNITED STATES PATENTS

| | | | |
|---|---|---|---|
| 3,451,538 | 6/1969 | Trementozzi | 206/46 |
| 3,607,978 | 9/1971 | Lee | 260/876 R |
| 3,634,547 | 1/1972 | Rose et al. | 260/876 R |

*Primary Examiner*—Stanford M. Levin
*Attorney, Agent, or Firm*—Oblon, Fisher, Spivak, McClelland & Maier

[57] ABSTRACT

A graft copolymer is provided which is characterized by excellent gas impermeability, transparency and impact strength, as well as good flowability, and hence good molding workability, by copolymerizing an olefinically unsaturated nitrile with an alkyl vinyl ether in the presence of a rubbery polymer, which contains at least 50% by weight of a conjugated diene; said olefinically unsaturated nitrile being present in an amount of from 60 to 95% by weight, based on the total weight of said olefinically unsaturated nitrile and said alkyl vinyl ether; and wherein said olefinically unsaturated nitrile and said alkyl ether are present in an amount of from 3 to 50 times by weight the quantity of said rubbery polymer.

10 Claims, No Drawings

PROCESS FOR PREPARING A GRAFT COPOLYMER

CROSS-REFERENCE TO RELATED APPLICATIONS

This application is a continuation-in-part application of Ser. No. 159,468, filed July 2, 1971, abandoned.

BACKGROUND OF THE INVENTION

1. Field of the Invention

The present invention relates to a process for preparing a graft copolymer. More particularly, the present invention relates to a process for preparing a graft copolymer which can be used for preparing bottles for cooling drinks, such as beer and cola; containers for foodstuffs or medicines; and packaging materials, such as for green vegetables, etc.

2. Description of Prior Art

Acrylonitrile polymers possess excellent transparency, but are so poor in molding workability, that it is particularly difficult to melt mold acrylonitrile polymers because of their poor flowability, even at temperatures as high as 250°C. Moreover, acrylonitrile polymers are so poor in impact strength that even when molded, they are quite easily broken.

It has been suggested in the prior art to alleviate these problems by copolymerizing acrylonitrile with other vinyl monomers, such as, for example, styrene, vinyl chloride, methyl acrylate, vinyl acetate, etc., but even when copolymerized according to those prior art suggestions, satisfactory impact strength cannot be obtained. It has also been suggested to copolymerize acrylonitrile with styrene in the presence of a butadiene polymer to form so-called "ABS resins", but such resin compositions are poor in transparency, even though they are excellent in flowability and impact strength. It has also been suggested to copolymerize an olefinic unsaturated nitrile, such as acrylonitrile, with an olefinic unsaturated carboxylic ester, such as an acrylate ester, in the presence of a nitrile rubber. However, although that expedient does result in improvements in flowability and impact strength, the copolymerization product does not possess satisfactory flowability properties.

It would be desirable to provide a resin composition which possesses a comparable degree of transparency and gas impermeability, as acrylonitrile polymers, yet which has sufficient flowability, so that it can be easily molded by conventional techniques, and whose molded products are high in impact strength, etc. Such a resin composition would be particularly well adapted for use in the formation of bottles and containers, such as for food stuffs, medicines, etc., whereby gases such as oxygen and carbon dioxide would be effectively excluded from the closed container or bottle.

SUMMARY OF THE INVENTION

Accordingly, it is one object of this invention to provide a resin composition having a high degree of transparency and gas inpermeability, yet which possesses good flow characteristics, so that it can be easily molded.

It is another object of this invention to provide a resin capable of forming transparent, molded articles of high impact strength and good as impermeability.

These and other objects have now herein been attained by providing a graft copolymer by copolymerizing an olefinically unsaturated nitrile with an alkyl vinyl ether in the presence of a rubbery polymer, which contains at least 50% by weight, of a conjugated diene; wherein said olefinically unsaturated nitrile is present in an amount of from 60 to 95% by weight, based on the total weight of said olefinically unsaturated nitrile and said alkyl vinyl ether; and wherein the total amount of said olefinically unsaturated nitrile and said alkyl vinyl ether is present in an amount of from 3 to 50 times by weight of said rubbery polymer.

DETAILED DESCRIPTION OF PREFERRED EMBODIMENTS

According to the present invention, an olefinically unsaturated nitrile is copolymerized with an alkyl vinyl ether in a specific ratio, in the presence of a rubbery polymer containing at least 50% by weight of a conjugated diene.

The rubbery polymers used in the process of the present invention are homopolymers or copolymers of a conjugated diene. Suitable conjugated dienes include 1,3-butadiene, isoprene, chloroprene and bromoprene, etc. Most preferred, from the standpoint of polymerization and economy, are those polymers formed by polymerizing 1,3-butadiene or isoprene. The conjugated diene may be copolymerized with one or more compatible vinyl comonomers, such as acrylonitrile, styrene, methyl acrylate, methyl methacrylate, or ethyl methacrylate. When the conjugated diene is copolymerized with another vinyl monomer, however, at least 50% by weight of the resulting copolymer should contain a conjugated diene. If the copolymer contains less than 50% conjugated diene, the copolymer will be lacking in rubber-like elasticity, and the final graft polymer product of this invention will be unsatisfactory in impact strength.

The rubbery conjugated diene homopolymers or copolymer used in the present invention should be relatively high in gel content and should contain preferably, at least 40%, and more preferably, at least 80% by weight of a gel content. The term "gel content" refers to the weight percentage of the toluene insoluble matter in the conjugated diene polymer. One method for making this measurement is to dissolve a sample of conjugated diene polymer in a toluene solution containing about 1 to 2 parts by weight of an antioxidant, such as tris-nonyl phenyl phosphite, per 100 parts of conjugated diene polymer. The solution is subsequently coagulated with methanol, and the coagulate is washed with water and dried in vacuum at 50°C. for 20 hours to prepare a sample. The sample is submerged in the toluene at 20°C. for 20 hours to remove an eluted portion. The weight percentage of the remaining insoluble material is defined as the gel content.

The above-described conjugated diene polymer may be prepared by any conventional technique, such as by bulk polymerization, solution polymerization, emulsion polymerization, or suspension polymerization. Emulsion polymerizaion is particularly preferred since it yields the polymerization product in the form of a latex, which can easily be further processed. When emulsion polymerization procedures are used, the monomer, catalyst and emulsifier are usually admixed in an aqueous medium, and the reaction is effected at temperatures of from 0° to 100°C. Any of the conventional emulsion polymerization emulsifiers, may be used, such as sodium rosinate, sodium oleate, sodium alkylbenzene sulfonate, sodium alkylnaphthalene sulfonate, etc., and any of the conventional emulsion polymerization catalysts may be used, such as, for example, potassium persulfate or so-called Redox peroxide catalysts, such as p-methane hydroperoxide, cumene hydroperoxide, benzoyl peroxide, etc. and a ferrous salt such as ferrous sulfate and sodium formaldehyde sulfoxylate. A molecular weight controlling agent such as n-dodecyl mercaptan, tert-dodecyl mercaptan, di-isopropyl xanthogen disulfide, etc., may also be included in the reaction mixture.

It is important, as indicated above, to provide a conjugated diene polymer having a high gel content. This can be accomplished by suitably controlling reaction conditions, such as by effecting polymerization at relatively high temperatures, by extending the polymerization reaction time, or by including a bi-functional monomer, such as divinyl benzene, ethylene glycol, dimethacrylate, propylene glycol dimethacrylate, butane diol diacrylate, etc., in an amount of from 0.01 to 5% by weight, based on the total amount of monomers.

The process of the present invention is to copolymerize an olefinically unsaturated nitrile with an alkylvinyl ether in the presence of the above-described conjugated diene polymer. The olefinically unsaturated nitriles used in the present invention are the $\alpha, \beta$-olefinically unsaturated mononitriles, having the structure:

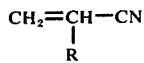

wherein R is hydrogen or a lower alkyl group of from 1 to 4 carbon atoms. Compounds falling within this formula include acrylonitrile, methacrylonitrile, ethacrylonitrile, and the like. The most preferred olefinically unsaturated nitriles are acrylonitrile and methacrylonitrile, and mixtures thereof (hereinafter being abbreviated as acrylonitrile). Suitable alkyl vinyl ethers used in this invention are the lower alkyl vinyl ethers having 1 to 4 carbon atoms in the alkyl group, such as methyl vinyl ether, ethyl vinyl ether, propyl vinyl ether and butyl vinyl ether.

Methyl vinyl ether or ethyl vinyl ethers are particularly preferred as the vinyl ether constituent, from the point of view of heat resistance and flowability of the final graft copolymer.

The acrylonitrile should be used in an amount of from 60 to 95% by weight, based on the total weight of acrylonitrile and alkyl vinyl ether. When the amount of acrylonitrile exceeds 95% by weight, the final graft copolymer will be low in flowability. If the quantity of acrylonitrile is less than 60% by weight, it will adversely affect the molecular weight of the resulting graft copolymer, and will result in the presence of unreacted vinyl ether.

The combination of acrylonitrile and alkyl vinyl ether monomers should be present in the mixture at between about 3 to 50 times, and preferably 5 to 20 times, the quantity of conjugated diene polymer used. When the quantity of monomers is outside this range, the final graft polymer obtained will not possess satisfactory gas impermeability, flowability, heat resistance, or impact strength, i.e., if the quantity of the monomer mixture exceeds 50 times that of the conjugated diene polymer, the impact strength will be substantially lowered, and, if less than 3 times the quantity of rubbery polymer is used, the flowability and gas impermeability will be quite deteriorated.

The acrylonitrile and vinyl ether mixture is copolymerized in the presence of the conjugated diene polymer. This can be accomplished by a wide variety of conventional methods, such as bulk polymerization, suspensions polymerization, emulsion polymerization or solution polymerization. Here again, however, it is especially preferred to use emulsion polymerization techniques by polymerizing the monomers in the conjugated diene polymer latex formed as above.

When emulsion polymerization techniques are used, the acrylonitrile and alkyl vinyl ether is mixed with the conjugated diene polymer in the desired ratio, in an aqueous medium and any of the well known emulsifiers, catalysts or other additives, are added thereto. Polymerization is then carried out at temperatures of from 0° to 100°C. After the polymerization reaction has been completed, a coagulant, such as, for example, methanol, or an aluminum sulfate aqueous solution, is added to the mixture to coagulate the resulting polymer. The coagulated polymer is then washed with water and dried, according to conventional methods.

The novel copolymer obtained in the process of the present invention is excellent in workability and hence can easily be blow molded, injection molded, etc. It possesses excellent gas impermeability, transparency and impact strength, and, good flowability. Hence, the polymer of this invention is particularly well suited for use in the formation of containers, packages, etc., for foodstuffs, medicines, etc.

The products of this invention are characterized by highly desirable physical properties which are unobtainable by any other technique. For instance, the products of this invention have the following properties:

Izod Impact Strength — above 9.0 kg-cm/cm$^2$
$CO_2$ Impermeability — below 1.0 ml-mm/m$^2$ day 760 mm Hg
$O_2$ Impermeability — below 1.0 ml-mm/m$^2$ day 760 mm Hg
Efflux rate — above 2.0 ×10$^{-4}$ cc/sec The properties of the resin composition of this invention are quite unique, and similar properties are not obtainable either by polymerizing a mixture of conjugated diene, acrylonitrile and vinyl ether monomer, nor by blending a conjugated diene polymer with a copolymer of acrylonitrile and vinyl ether. Moreover, even if an olefinic unsaturated carboxylic ester, such as methyl acrylate, is used instead of the vinyl ether, in the process of the present invention, the final product polymer will not be completely satisfactory, since it will not possess suitable flowability. Even such copolymers as those obtained by copolymerizing acrylonitrile and a vinyl ether in the presence of a conjugated diene polymer, or copolymer, will not possess the comparable superior properties as in the present invention, and, in particular, will be poor in impact strength.

Having generally described the invention, a further understanding can be attained by reference to certain specific Examples which are provided herein for purposes of illustration only and are not intended to be limiting unless otherwise specified. In these Examples, all "parts" and "percentages" are intended to be "parts by weight" and "percent by weight".

EXAMPLE 1

The following butadiene-acrylonitrile copolymer latex was prepared in a 1 liter reaction vessel:

| | |
|---|---|
| Acrylonitrile | 30 parts |
| 1,3-Butadiene | 70 parts |
| Deionized water | 200 parts |
| Emulsifier (MX-1478) | 13.5 parts |
| (30% aq. anion type of surface active agent manufactured by Kao Soap Company) | |
| Potassium persulfate | 0.10 part |
| tert-Dodecylmercaptan | 0.50 part |

A uniform latex containing 33.7% by weight, of solid was obtained by conducting the polymerization reaction while stirring, for 20 hours, and maintaining the reaction temperature at 50°C. According to the nitrogen analysis, the acrylonitrile content in the polymer was 27.1% by weight. A solution containing 1.5 parts of tris-nonyl phenyl phosphite (antioxidant), per 100 parts of solid content of the latex, in toluene, was added to the latex. After sufficient stirring, the latex was coagulated by addition of methanol. The coagulate was washed with water and, thereafter, dried in vacuum at 50°C. for 20 hours. The polymer so obtained was used as a sample, and weighed on a 20-mesh size wire netting. The wire netting was submerged in toluene at 20°C. for 20 hours to remove the eluted portion, and the quantity remaining was measured and reported as a gel content. By this method, the gel content was found to be 79.6% by weight. Acrylonitrile and methyl vinyl ether were copolymerized in the presence of an acrylonitrile-butadiene copolymer latex obtained by polymerizing the following:

| | |
|---|---|
| Acrylonitrile butadiene copolymer latex | 30.5 parts |
| | (solid content 10.0 parts) |
| Deionized water | 200 parts |
| Emulsifier (MX-1478) | 10 parts |
| Potassium persulfate | 0.06 part |
| Acrylonitrile | 80 parts |
| Methyl vinyl ether | 20 parts |
| n-Dodecylmercaptan | 3 parts |

The polymerization reaction was carried out with stirring, for 15 hours, while maintaining the reaction temperature at 60°C. A milk-white latex containing 32% by weight, of solid, was obtained.

After adding an aqueous solution of aluminum sulfate to this latex, to coagulate a polymer, the polymer was washed with water, and dried in a thermostating drier at 60°C. for 15 hours to obtain a white powdery polymer. This polymer was press molded at a temperature of 200°C. and under pressure of 200 kg/cm$^2$ using an oil press to obtain a good transparent molded article. The article was found to have an Izod impact strength of 44.0 kg.cm/cm$^2$ as determined by ASTM D-256-56. Next, the molded article was extended by means of a bi-axial extender to obtain a film of 0.02 mm. in thickness. The gas permeability coefficient was measured by using a Lyssy type of gas permeating apparatus. Gas permeabilities of 0.20 ml.mm/m$^2$.day.760 mmHg and 0.14 ml.mm/m$^2$/day. 760 mmHg were measured for carbon dioxide and oxygen, respectively. The efflux rate of this polymer from a nozzle of 1 mm. in diameter and 2 mm. in length was $3.1 \times 10^{-4}$ cc/sec. was found to be 30 kg/cm$^2$ at a temperature of 190°C., using a Koka-type flow tester.

COMPARATIVE EXAMPLE 1

Copolymerization was carried out in the same manner as in Example 1 with the exception that 20 parts of methyl acrylate was substituted for 20 parts of methyl vinyl ether. The polymer obtained was found to have an efflux rate of $0.75 \times 10^{-4}$ cc/sec. and an Izod impact strength of 5.3 kg.cm/cm$^2$.

EXAMPLES 2 and 3

An acrylonitrile-butadiene copolymer latex was prepared in the same manner as in Example 1 except that the polymerization reaction time and temperature were varied as shown in Table 1. The copolymerization of acrylonitrile and methyl vinyl ether was carried out using the same reactants as in Example 1.

Table 1

| | Polymerization temperature, °C | Polymerization time, hour | Gel content %, by wt. | Izod Impact strength, kg.cm/cm$^2$ |
|---|---|---|---|---|
| Example 2 | 70 | 13 | 96.1 | 11.0 |
| Example 3 | 60 | 5 | 85.0 | 15.9 |

| | Efflux rate, cc/sec. | Gas permeability coefficient ml.mm/m$^2$.day.760 mmHg. | |
|---|---|---|---|
| | | $CO_2$ | $O_2$ |
| Example 2 | $17.0 \times 10^{-4}$ | 0.14 | 0.14 |
| Example 3 | $2.1 \times 10^{-4}$ | — | — |

EXAMPLE 4

A butadiene-acrylonitrile copolymer latex was prepared in the same manner as in Example 1 except that the polymerization time was 7 hours. The polymer obtained was 27.7% by weight, in acrylonitrile content, 43.9% by weight, in gel content and 33%, by weight in solid content in latex.

The copolymerization of acrylonitrile and methyl vinyl ether was carried out with the same reactants under the same conditions as in Example 1, except said latex was used. The polymer obtained was found to have an efflux rate of $2.0 \times 10^{-4}$ cc/sec. and an Izod impact strength for molded transparent articles of 23.0 kg.cm/cm$^2$. The transmittance of light of a wavelength 600m$\mu$, through a molded article, 3 mm in thickness, as measured by a spectrophotometer manufactured by Hitachi Limited, was 92%. As comparison, the light transmittance of polymethylmethacrylate and polystyrene using the above measuring method was 92 and 83%, respectively.

COMPARATIVE EXAMPLE 2

The copolymerization of acrylonitrile and methyl acrylate was carried out in the same manner as in Example 1 with the exception that 20 parts of methyl acrylate was used instead of the 20 parts of methyl vinyl ether in Example 4. The polymer obtained was found to have an efflux rate of $0.046 \times 10^{-4}$ cc/sec. and an Izod impact strength for a molded article of 7.0 kg.cm/cm$^2$.

EXAMPLES 5 and 6

A butadiene-methyl acrylate copolymer latex was prepared using the following:

| | |
|---|---|
| Methyl acrylate | 40 parts |
| 1,3-Butadiene | 60 parts |
| Deionized water | 200 parts |
| Emulsifier (MX-1478) | 13.5 parts |
| Potassium persulfate | 0.20 part |
| tert-Dodecyl mercaptan | 0.50 part |

Polymerization was effected while stirring for 20 hours at a reaction temperature of 60°C. A uniform latex, containing 26.5%, by weight, of solid was obtained. According to elementary analysis, the copolymer was 34%, by weight methacrylate content and 48.5% by weight, in gel content.

The copolymerization of acrylonitrile and methyl vinyl ether or acrylonitrile and ethyl vinyl ether was carried out in the presence of a butadiene-methyl acrylate copolymer latex obtained with the following:

| | |
|---|---|
| Butadiene-methylacrylate copolymer latex | 56.8 parts |
| | (solid content 15 parts) |
| Deionized water | 200 parts |
| Emulsifier (MX-1478) | 10 parts |
| Potassium persulfate | 0.06 part |
| Acrylonitrile | 80 parts |
| Vinyl ether | 20 parts |
| n-Dodecyl mercaptan | 3 parts |

The polymerization reaction was carried out at a temperature of 60°C for 15 hours and the product was treated as in Example 1. This polymer was molded to obtain a molded transparent article. The properties of the polymers obtained were as shown in Table 2.

Table 2

| | Vinyl ether | Izod impact strength, kg.cm/cm$^2$ | Efflux rate, cc/sec. |
|---|---|---|---|
| Example 5 | methyl vinyl ether | 9.2 | 5.4 × 10$^{-4}$ |
| Example 6 | ethyl vinyl ether | 12.2 | 28 × 10$^{-4}$ |

EXAMPLES 7 and 8

A butadiene-acrylonitrile-divinyl benzene copolymer latex was prepared in accordance with the following polymerization recipe.

| | |
|---|---|
| 1,3-Butadiene | 70 parts |
| Acrylonitrile | 30 parts |
| Divinyl benzene | 0.5 part |
| Deionized water | 200 parts |
| Emulsifier (MX-1478) | 13.5 parts |
| Potassium persulfate | 0.20 part |
| tert-Dodecyl mercaptan | 0.50 part |

Polymerization was effected while stirring for 6 hours at a reaction temperature of 45°C. A uniform latex, containing 31.5%, by weight, of solid was obtained.

According to the nitrogen analysis the copolymer was 29.4%, by weight, in AN content and 89.9% by weight, in gel content.

The copolymerization of acrylonitrile and methyl vinyl ether or acrylonitrile and ethyl vinyl ether was carried out in the presence of the copolymer latex obtained according to the following:

| | |
|---|---|
| Butadiene-acrylonitrile-divinyl benzene copolymer latex | 31.8 parts |
| | (solid content 10 parts) |
| Deionized water | 200 parts |
| Emulsifier (MX-1478) | 10 parts |
| Potassium persulfate | 0.06 part |
| Acrylonitrile | 80 parts |
| Vinyl ether | 20 parts |
| n-Dodecyl mercaptan | 3 parts |

The polymerization reaction was carried out at a temperature of 60°C for 15 hours and the product was treated in the same manner as in Example 1. Press molded articles prepared with this copolymer were transparent.

The properties of the polymer obtained were as shown in Table 3.

Table 3

| | Vinyl ether | Izod impact strength, kg.cm/cm$^2$ | Efflux rate, cc/sec. |
|---|---|---|---|
| Example 7 | methyl vinyl ether | 17.5 | 4.0 × 10$^{-4}$ |
| Example 8 | ethyl vinyl ether | 11.4 | 23 × 10$^{-4}$ |

EXAMPLE 9

A butadiene-acrylonitrile-butane diol diacrylate copolymer latex was prepared in the same manner as in Examples 7 and 8 with the exception that butane diol diacrylate was used instead of divinyl benzene.

The latex obtained was 30.5%, by weight, in solid content, 28.1%, by weight, in AN content of copolymer according to the elementary analysis, and 95.5%, by weight, in gel content.

The copolymerization of acrylonitrile and methyl vinyl ether was carried out in the presence of the above described latex in the same manner as in Example 7.

The press molded article of the copolymer obtained was transparent, had an Izod impact strength of 9.2 kg.cm/cm$^2$ and an efflux rate of 7.8 × 10$^{-4}$ cc/sec.

EXAMPLE 10

A butadiene-acrylonitrile copolymer latex was prepared in a 1 liter reaction vessel using the following reactants:

| | |
|---|---|
| Acrylonitrile | 50 parts |
| 1,3-Butadiene | 150 parts |
| Deionized water | 400 parts |
| Emulsifier (MX-1478) | 27 parts |
| Potassium persulfate | 0.2 part |
| tert-Dodecyl mercaptan | 0.9 part |

Polymerization was effected while stirring for 6 hours, at a reaction temperature of 45°C. A uniform latex of 31% by weight, in solid content was obtained. The polymer conversion was 97% and the acrylonitrile content in polymer was 29.5%, by weight, according to the nitrogen analysis.

The copolymerization of acrylonitrile and ethyl vinyl ether was carried out in the presence of a polymer latex obtained under the following polymerization conditions.

| | |
|---|---|
| Diene polymer latex | 45 parts |
| | (solid content 14.0 parts) |
| Deionized water | 200 parts |
| Emulsifier (MX-1478) | 10 parts |
| Potassium persulfate | 0.06 part |

| Acrylonitrile | 70 parts |
| --- | --- |
| Ethyl vinyl ether | 30 parts |
| n-Dodecyl mercaptan | 3 parts |

The polymerization reaction was carried out at a temperature of 60°C for 15 hours and the product was treated by the same method as in Example 1. This polymer was found to have an efflux rate of 79 × $10^{-4}$ cc/sec. and a press molded article of the polymer was transparent. Its Izod impact strength was 11.6 kg.cm/cm². The gas permeability coeefficient measured on the above article was 0.21 ml.mm/m².24 hr. 760 mmHg and 0.05 ml.mm/m².24 hr. 760 mmHg for carbon dioxide and oxygen, respectively. For comparison, the gas permeability coefficients measured on a vinylidene chloride-vinyl chloride copolymer film and 6-Nylon film were 0.81 ml.mm/m².24 hr. 760 mmHg and 1.63 ml.mm/m².24 hr. 760 mmHg, respectively, for carbon dioxide, and 0.32 ml.mm/m².24 hr. 760 mmHg and 0.63 ml.mm/m².24 hr. 760 mmHg, respectively, for oxygen.

COMPARATIVE EXAMPLE 3

Copolymerization was carried out under the same conditions as in Example 10, except the quantity of acrylonitrile and ethyl vinyl ether used were changed from 70 parts to 97 parts and from 30 parts to 3 parts, respectively. The polymer obtained did not show flowability in Koka-type flow tester and a press molded article uniformly molten could not be obtained therefrom.

COMPARATIVE EXAMPLE 4

Copolymerization was carried out under the same conditions as in Example 10 with the exception of substituting 30 parts of vinyl acetate for 30 parts of ethyl vinyl ether. The polymer obtained did not show flowability in Koka-type flow tester and the molded article was low as 1.5 kg.cm/cm² in Izod impact strength. When polymerization was effected in similar manner, using 30 parts of styrene, vinylidene chloride, or vinyl chloride in place of 30 parts of ethyl vinyl ether, the resins obtained were brown in color and opaque, and too brittle to be molded.

EXAMPLE 11

A butadiene-methyl acrylate copolymer latex was prepared using the following polymerization reactants.

| Methyl acrylate | 12 parts |
| --- | --- |
| 1,3-Butadiene | 18 parts |
| Deionized water | 60 parts |
| Emulsifier (MX-1478) | 4 parts |
| Potassium persulfate | 0.06 part |
| tert-Dodecyl mercaptan | 0.15 part |

The polymerization was effected while stirring for 15 hours, at a reaction temperature of 45°C. The polymer obtained was 75% in polymer conversion and 32%, by weight, methyl acrylate according to the elementary analysis.

The copolymerization of acrylonitrile and ethyl vinyl ether was carried out in the presence of the above polymer latex of diene system obtained under the following conditions.

| The above diene polymer latex | 27 parts |
| --- | --- |
| | (solid content 8.6 parts) |
| Deionized water | 80 parts |
| Emulsifier (MX-1478) | 4 parts |
| Potassium persulfate | 0.024 part |
| Acrylonitrile | 32 parts |
| Ethyl vinyl ether | 8 parts |
| n-Dodecyl mercaptan | 1.2 part |

The polymerization reaction was carried out under stirring for 15 hours while maintaining the temperature at 60°C. The polymer obtained had an efflux rate of 4.2 × $10^{-4}$ cc/sec. and an Izod impact strength for molded articles of 21.3 kg.cm/cm².

COMPARATIVE EXAMPLE 5

The polymerization was carried out in the same manner as in Example 11 with the exception that 8 parts of methyl acrylate was used instead of 8 parts of ethyl vinyl ether. The polymer obtained did not show flowability in Koka-type flow tester. The molded article had an Izod impact strength of 10.3 kg.cm/cm².

EXAMPLE 12

The copolymerization of acrylonitrile and ethyl vinyl ether was carried out in the presence of polybutadiene latex having a solid content of 23.7%, by weight.

| Polybutadiene latex | 27 parts |
| --- | --- |
| | (solid content 6.4 parts) |
| Deionized water | 120 parts |
| Emulsifier (MX-1478) | 6 parts |
| Potassium persulfate | 0.036 part |
| Acrylonitrile | 48 parts |
| Ethyl vinyl ether | 12 parts |
| n-Dodecyl mercaptan | 1.8 part |

The polymerization reaction was carried out at a temperature of 60°C for 13 hours and the resulting product was treated by the same method as in Example 1. The polymer obtained had an efflux rate of 6.3 × $10^{-4}$ cc/sec. and its molded transparent article had an Izod impact strength of 9.8 kg.cm/cm².

Having now fully described the invention, it will be apparent to one of ordinary skill in the art that many changes and modifications can be made thereto without departing from the spirit or scope thereof.

What is claimed and desired to be protected by Letters Patent is:

1. A product prepared by the process for preparing a graft copolymer consisting essentially of
   A. copolymerizing acrylonitrile or methacrylonitrile or a mixture thereof with an alkyl vinyl ether containing $C_1$–$C_4$ alkyl groups, in the presence of
   B. a homopolymer of a conjugated diene or a copolymer containing at least 50%, by weight, of said conjugated diene and a vinyl monomer, using
   C. potassium persulfate as a catalyst in an emulsion medium, with
   D. n-dodecyl mercaptan, t-dodecyl mercaptan or di-isopropyl xanthogen disulfide as a chain transfer agent,
   E. at a polymerization temperature during the graft polymerization of from 0° to 100°C, said nitrile being present in an amount of from 60 to 95 %, by weight, based on the total weight of said nitrile and said alkyl vinyl ether, and the total amount of said nitrile and said alkyl vinyl ether being present in an amount of from 3–50 times by weight the quantity of said homopolymer or copolymer.

2. The product as set forth in claim 1, wherein said alkyl vinyl ether is methyl vinyl ether.

3. The product as set forth in claim 1, wherein said alkyl vinyl ether is ethyl vinyl ether.

4. The product as set forth in claim 1, wherein said copolymer is from 1,3-butadiene and acrylonitrile.

5. The product as set forth in claim 1, wherein said copolymer is from 1,3-butadiene and styrene.

6. The product as set forth in claim 1, wherein said copolymer is from 1,3-butadiene and methyl acrylate.

7. The product as set forth in claim 1, wherein said copolymer is from 1,3-butadiene and ethyl acrylate.

8. The product as set forth in claim 1, wherein said copolymer is from 1,3-butadiene and methyl methacrylate.

9. The product as set forth in claim 1, wherein said copolymer is at least 40%, by weight, in gel content.

10. The product of claim 1, whose physical properties are an Izod impact strength of greater than 9.0 kg.cm/cm$^2$, $CO_2$ impermeability of below 1.0 mlmm/m$^2$.day. 760 mmHg $O_2$ impermeability of below 1.0 ml.mm/m$^2$.day. 760 mmHg and an efflux rate of greater than $2.0 \times 10^{-4}$ cc/sec.

* * * * *